United States Patent [19]

Wakamatsu

[11] 4,144,405
[45] Mar. 13, 1979

[54] CHARACTER WRITING SYSTEM

[76] Inventor: Shuichi Wakamatsu, 33-21, Nakahara 4-chome, Mitaka-shi, Tokyo-to, Japan

[21] Appl. No.: 822,230

[22] Filed: Aug. 5, 1977

[51] Int. Cl.² ............... G06K 15/20; B41B 19/04; G06F 3/02
[52] U.S. Cl. ............................. 178/30; 400/110; 340/706; 340/751; 340/799
[58] Field of Search ............ 340/172.5, 324 A, 365 R; 197/1 A; 178/30; 364/900; 95/45.5 J

[56] References Cited

U.S. PATENT DOCUMENTS

| | | | |
|---|---|---|---|
| 2,950,800 | 8/1960 | Caldwell | 197/1 A |
| 3,248,725 | 4/1966 | Low et al. | 340/324 A |
| 3,665,450 | 5/1972 | Leban | 340/324 A |
| 3,809,203 | 5/1974 | Ogawa et al. | 197/1 A |
| 3,950,734 | 4/1976 | Li | 197/1 A X |

FOREIGN PATENT DOCUMENTS 2018868 11/1971 Fed. Rep. of Germany .......... 179/1 A

OTHER PUBLICATIONS

IBM Tech Dis Bull: Oriental Typewriter, by Lahr, vol. 10, No. 4, Sep. 1967, pp. 439-440.

Primary Examiner—Thomas A. Robinson
Attorney, Agent, or Firm—Spensley, Horn, Jubas & Lubitz

[57] ABSTRACT

Each Kanji-character is divided into a plurality of part contours constituting the Kanji-character. The part contours of a character are sequentially designated according to the conventional order of writing various parts of the character by an input unit. In an output unit the designated part contours are sequentially printed or otherwise written for completing a character by the combination of one or more part contours. Between the input and output units is provided a processing unit for controlling the relative position and order of the part contours to be written. Space means is also provided to provide spaces between adjacent written characters. According to the system some of the part contours are used in common for synthesizing different Kanji-characters.

21 Claims, 73 Drawing Figures

FIG. 1 PRIOR ART
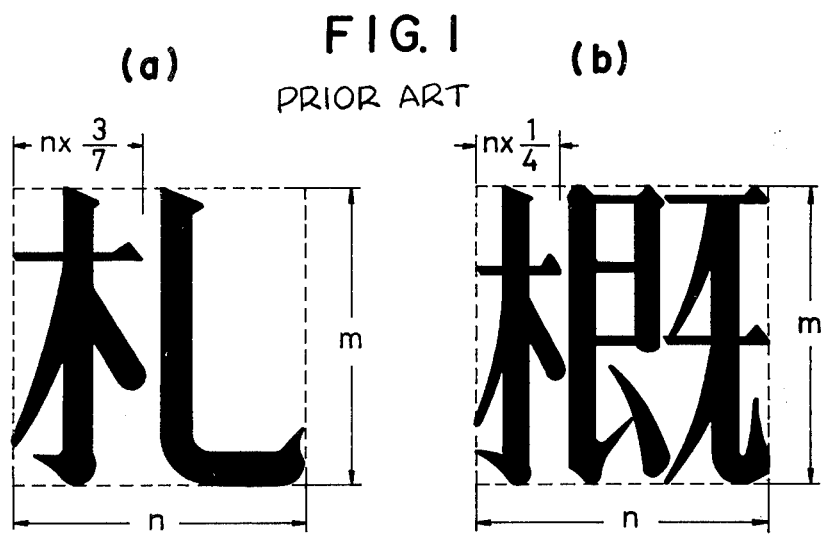
FIG. 2
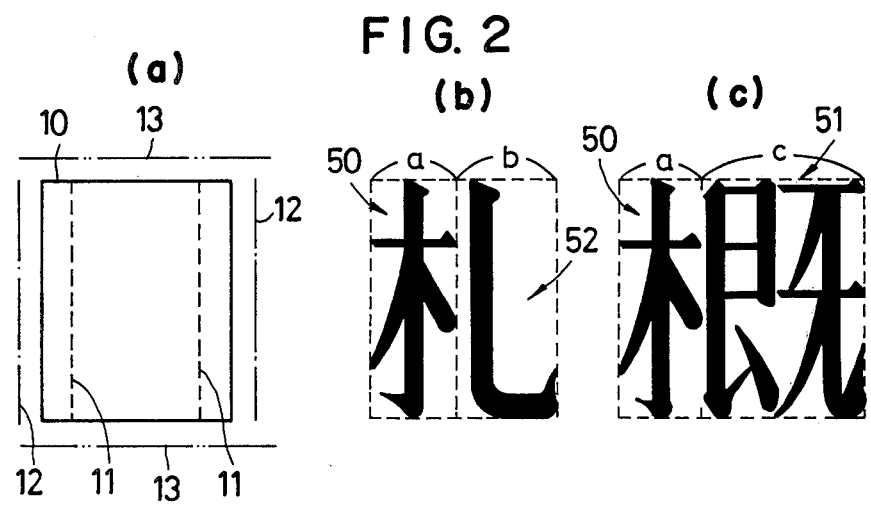
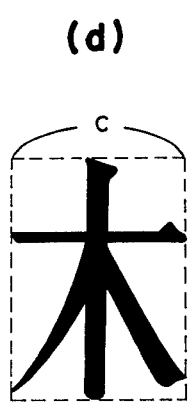

FIG. 3
(a) 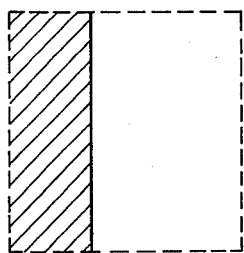
(b) 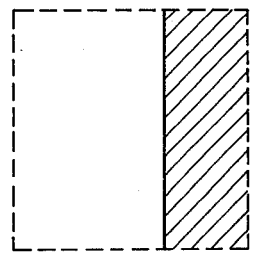
(c) 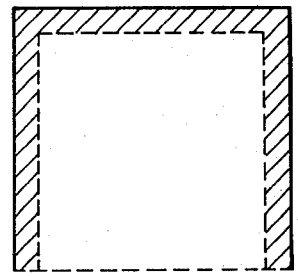
(d) 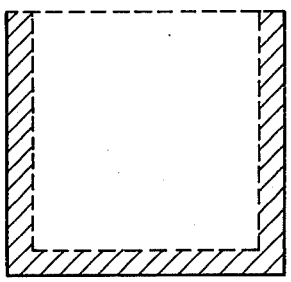
(e) 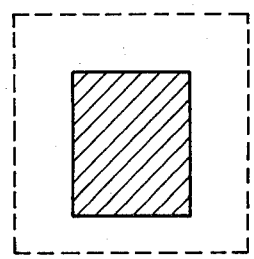
(f) 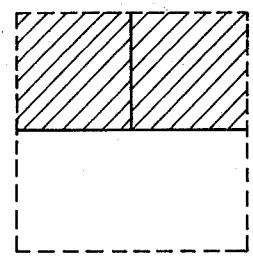
(g) 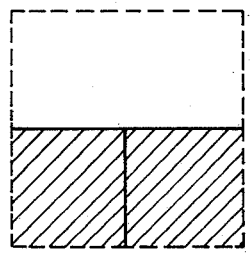
FIG. 4
(a) 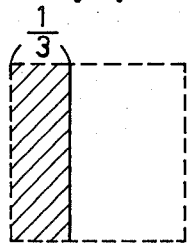
(b) 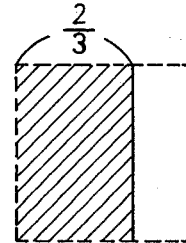
(c) 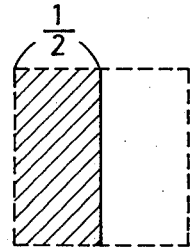
(d) 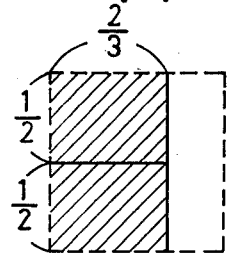
(e) 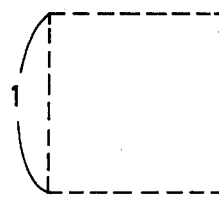
(f) 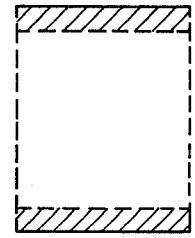

(a)  (b)

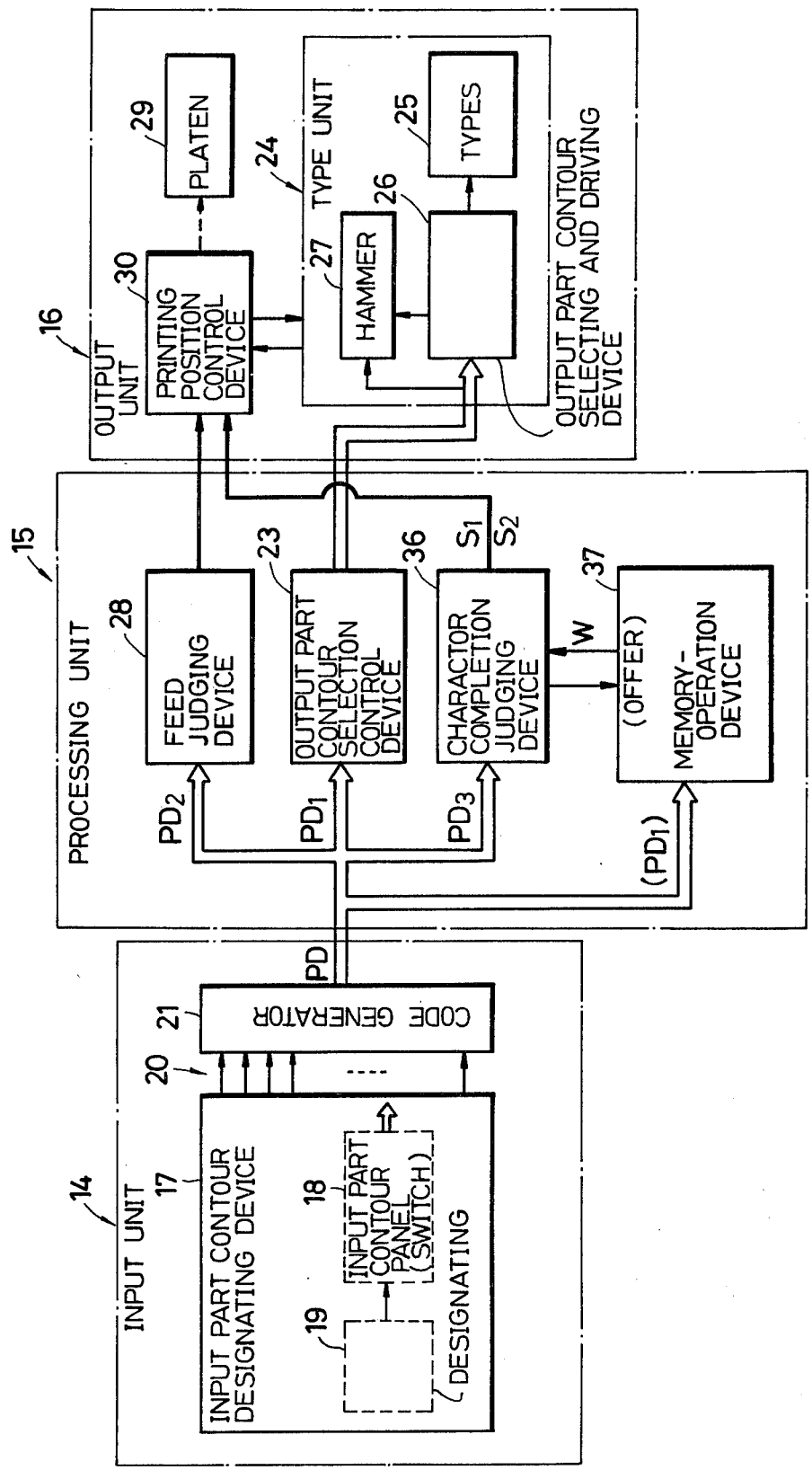

CHARACTER WRITING SYSTEM

BACKGROUND OF THE INVENTION

This invention relates to Kanji-character writing devices utilized not only to type Kanji-characters but also used as input/output terminal devices of electronic computers, Kanji-character teletypewriter systems, input/output devices for printing devices and many other fields.

The number of type elements in a conventional Kanji-character typewriter is much greater than the number of characters in western alphabets, which makes it difficult to miniaturize typewriters of Japanese and Kanji-characters and greatly decreases efficiency in the work of typewriting. For example, while the number of alphabet characters is only 26, the number of Kanji-characters that are daily used in Japan amounts to several thousands. When added with special Kanji-characters which are used to represent names of individuals and local places, a Kanji-character typewriter must store more than ten thousands type elements. For this reason, it is extremely difficult for an unskilled typist to find desired type elements so that special training is necessary for the typists who operate Japanese typewriters.

It is a principal object of this invention to provide a novel Kanji-character writing device which is simple in construction, and can readily seach out desired characters.

Typewriters for printing Kanji-characters or for printing alphabets are constructed such that each type element corresponds to one character. Accordingly, it has been inevitable that the size of typewriters utilized to print such Kanji-characters has increased, and until today no revolutionary improvement has been made for simplifying Kanji-character typewriters. Yet the development regarding Kanji-character information processing technique in the peripheral input/output device of electronic computers is remarkable in recent years. However, such development is limited to the Kanji-character input and output systems for use in computers. According to one Kanji-character input system which was developed for the purpose of miniaturizing a Kanji-character input panel or a Kanji-character input keyboard, an input Kanji-character is formed by synthesizing a number of patterns. The pattern herein used means an abstractive symbol representing a portion of a Kanji-character. Generally Kanji-characters are made up of a single part or a combination of several independent or non-overlapping component parts such as "Hen" "Tsukuri," "Kammuri," and Shinnyo. In the following description, these parts are designated as "part contours" and since each part comprises a specific arrangement of segments when it is intended to express the structure of a combination of segments, a term "segment structure" is used. The abstractive symbol used for this purpose is an abstractive profile representing the positional relationship and size of a particular portion of a Kanji-character. To synthesize a number of input patterns into a desired profile it is necessary to use a function input that designates the synthesized profile in addition to the input patterns. Accordingly, such an input system requires additional input elements thus complicating the system. In addition, such a system must be operated by a skilled expert because, to give a correct designation, the operator must have accurate knowledge of the content and meaning of the various function inputs.

In the prior art Kanji-character input system described above, although it is possible to decrease to a certain extent the size of the input panel because it is necessary to arrange only the pattern displays on the Kanji-character display panel, an additional load is imposed upon the source because special function inputs are required. Moreover, the computer should be provided with a large capacity memory device capable of storing information of at least several thousands of Kanji-characters according to the pattern input system which increases the size and cost.

The prior art Kanji-character output systems include a type element printing system, a dot matrix system, a stroke system, a letter analogue system and a letter optical system, but in each system one letter is made to correspond to one character so as to produce and write one character as one unit. For this reason, where a large number of character type elements is involved, the output mechanism becomes bulky.

In each of the prior art Kanji-character information processing systems, the input and output systems are independent so that they can operate only through an intermediary action of a computer. Thus, the prior art processing system is extremely complicated.

SUMMARY OF THE INVENTION

In manufacturing a Kanji-character writing device it is essential that the device be constructed such that it can be used in the same manner as the characters which are daily used. For this reason it is not advantageous to excessively abstract the Kanji-character by merely symbolizing it and to use a function input for combining partial abstractive patterns of the symbolized Kanji-character as in the prior art device. Persons who use Kanji-characters daily do not identify such Kanji-characters as a collection of separate symbols but identify them as "Gestalt" (shape). Based on this conception we propose the following consideration.

More particularly we propose to divide each Kanji-character into part contours, that is, "parts of the character" each having a concrete size and profile and then to combine one or more of the parts contours according to a predetermined positional relationship into one character.

In the following description, the term "contour" or "contour construction" does not mean an abstractive segment depiction but instead a skeleton structure or a portion thereof of a Kanji-character or a symbol which has already been framed by predetermined type face elements. Furthermore, the term "write" does not mean hand writing but means mechanical writing made in response to a command by a man such as a manual operation (writing of characters by types, typewriting, typesetting printing, optical display electronic printing, etc.) as well as communications by a man-machine system.

The effectiveness of the method of writing respective character by utilizing concrete parts thereof will become apparent as the description proceeds. Briefly stated, this method enables to use an identical character part contour for different characters which miniaturizes the writing device and simplifies inputs for writing.

Thus, the part or part contour used herein is specific in the following points.

First, it has a concrete size.

Second, it has a concrete form or profile.

Third, the part contour occupies a specific position in each character with respect to the other parts thereof.

To write or generate a character, when one character is handled as one unit, the device becomes bulky because of a great many types of the Kanji-characters.

Particular attention should be directed to a fixed conception that every Kanji-character is confined in a definite frame whether it is complicated or simple. This is a conception common to all prior art Kanji-character writing (or generating) systems except hand written characters. Consequently, the parts or abstractive part patterns such as "Hen" and "Tsukuri" that are mechanically written can be classified into the same parts without regard to their size and position but their size and position which they actually assume differ from one character to the other. To illustrate this, two characters are shown in FIGS. 1a and 1b in the conventional type form. In these figures the frame of the characters shown by dotted lines has a dimension of n × m (in a regular type form n = m). This size is definite for all characters provided that the type point is constant. To have a better balance of the character in the definite frame the symbol (the radical "Ki-Hen" on the lefthand side of each character) has a width of 3/7 in the character of FIG. 1a, whereas ¼ in the character of FIG. 1b although both symbols have the same contour and meaning. For this reason, in the prior art system both radicals (Ki-hen) of FIGS. 1a and 1b were processed as different ones. Consequently, in the prior art system, at the input stage of a computer, the illustrated radical (Ki-hen) would be used commonly as a part contour for forming a concrete symbol but in the output stage (character writing stage) it has been necessary to process the radicals shown in FIGS. 1a and 1b as different ones. For this reason, the part contours which have been used in the prior art systems are mere abstractive symbols not directly related to the writing operation (character writing.

In addition to the conception of "part contour" described above, the invention poposes to remove the limit of definite frame of each complete Kanji-character.

More particularly, the invention is characterized in that the concept of a definite frame which limits the contour of all letter forms has been avoided for giving versatility to the height and width of the character to the extent not to impair the legibility, readability and balance when a sentence is written by a series of characters thereby enabling to use the same part contour for different characters for both input and output systems. The system proposed by the inventor wherein the width and height of a character is variable is termed a "flexible body system" and one example thereof will be described with reference to FIG. 2. A body shown by solid lines 10 in FIG. 2a is termed a "fundamental body". According to the flexible body system, the width of the frame of a complete Kanji-character is narrower than that of the fundamental body as shown by broken lines 11 in one case or wider in the other case as shown by dot and dash lines 12. In still another case the height of the frame is larger than that of the fundamental body 10 as shown by dot and dash lines 13. The variation in the height and width is suitably determined by the complexity of the character elements of respective Kanji-characters, the possibility of common use of a part contour and appearance of the character. Even when the height and width vary slightly, a sentence displayed by a series of Kanji-characters generally conforms to the fundamental body so that the appearance or balance of the sentence would not be impaired.

The possibility of common use of the part contour according to this invention will now be described with reference to two Kanji-characters shown in FIGS. 1a and 1b which are written according to the conventional form. According to this invention, the part contour of a portion 50 of a Kanji-character shown in FIG. 2b and having a width a is identical to the part contour of a portion 50 shown in FIG. 2c and having a width a of so that two portions 50 can be shown by the same part contour. The part contour of the remaining portion of the Kanji-character shown in FIG. 2c has a width of c. By setting the ratio a:c to above ⅓:⅔, for example, it is possible to write the Kanji-characters without impairing the appearance and balance of these as shown in FIGS. 2b and 2c.

According to this invention, a Kanji-character of a simple form as shown in FIG. 2d is not written by a combination of a plurality of part contours but by a single part contour which represent a Kanji-character by itself. The character shown in FIG. 2d has a meaning of "tree." Denoting the width of the Kanji-character, that is, the part contour thereof shown in FIG. 2d by c, since the ratio a:c was selected to be ⅓:⅔, the part contour of the width c for the Kanji character shown in FIG. 2d is different from the part contour of the portion a (having a width of a of the Kanji-characters shown in FIGS. 2b and 2c). According to the conventional conception regarding the "part pattern" or "symbol" said two part contours have been treated to be identical but according to the conception of the "part contour" of this invention they are different. This constitutes the fundamental difference between the conceptions of this invention and the prior art. As above described, the conception of the "part contour" of this invention also includes a part contour that constitutes one character by itself.

Denoting the width of the righthand portion 52 of the character shown in FIG. 2b by b and let us select the ratio a:b:c to be ⅓:⅓:⅔ then the total width of the character shown in FIG. 2b is $a + b = \frac{1}{3} + \frac{1}{3}$ whereas the total width of the character shown in FIG. 2c is $a + c = \frac{1}{3} + \frac{2}{3}$. Thus, the total widths of both characters are different, which corresponds to the "flexible body." The part contour of the righthand portion 51 of the character shown in FIG. 2c can be used as one independent character. The width c of this portion 51 is also different from those of the characters shown in FIGS. 2b. and 2c.

Some of the part contours can be divided into smaller sub-part contours, so that it is possible to construct a part contour by combining a number of sub-part contours.

From the foregoing description, the importance of the "part contour" as herein defined will be clearly understood. It will also be understood the the conception of the "part contour" is quite different from the abstractive patterns such as the radical, or part patterns that heretofore have been used.

Summarizing the premise conditions of this invention, each character (including a letter contours), and the part contours is commonly used for different characters thereby simplifying input and output devices and minimizing the members of the input and output elements. The conventional conception of confining every Kanji-character in a definite frame has been destroyed and mechanical printing of the characters having the established construction as above described has now been destroyed. According to this invention, the frames of the Kanji-characters are made to be versatile so that the identical "part contour" can be used for different Kanji-characters.

The invention is characterized by the following features. More particularly a concrete "part contour" is used as a unit of writing. As a result of writing made by a desired combination of such concrete "part contours" it is possible to write different Kanji-characters. As has been pointed out hereinabove, the term "write" means mechanical writing in response to the operators command and "writing operation" means the operation of a mechanical system including input and output devices. More particularly, the input device is constructed to input a "part contour" as one unit and the operation or code signal of the machine utilized for processing informations is also constructed to process a "part contour" as one unit. The output device is also constructed to produce an output that can display a "part contour" as one unit. Thus where a typewriter is used as the output device, type elements corresponding to respective "part contours" are provided for the typewriter and in a phototype setting machine, negative films are prepared to contain respective "part contours", also in a dot matrix type character generating system, a type of each dot is driven by using a "part contour" as one unit. In this manner, the "part contour" is used in common for different characters not only for input and output devices but also for the entire processing steps. This greatly miniaturizes the writing device.

According to this invention, the manner of combining a plurality of part contours is not designated independently of the input designations of respective part contours but the manner of combining is automatically determined by designating the inputs of respective part contours according to the order of writing respective segments (that is from upper to lower from left to right, etc.) of each character and also according to the relative position of respective part contour of a given character. Furthermore, according to this invention, the beginning and the end of each character are determined by a specific portion of a part contour or the order of writing the segments thereof. For this reason, it is not necessary to provide any special space input for discriminating adjacent Kanji-characters and it is only necessary to apply required part contour designation inputs according to the writers own custom of writing various segments of the part contour.

The term "position of a part contour" is used herein to mean the relative position of a specific part contour relative to the entire character which is formed by a combination of the specific part contour and one or more other part contours. For this reason, considering a particular part contour it will not always occupy a specific position. As can be noted by analyzing a plurality of Kanji-characters there are some part contours that have specific positions. In short, the position of part contour is independently determined for each Kanji-character, that is determined by the order of writing respective part contour when writing each character and other factors inherent in each language system.

According to this invention, when indicating various part contours on a input designation panel or a keyboard, various part contours are classified and arranged in respective regions of the panel so as to simulate, as far as possible, the positions occupied by the part contours in each character. This facilitates finding of the desired part contours which are to be input.

In the following description of the embodiment of this invention, terms "input part contour" and "output part contour" are used which are covered by the term "part contour". The term "input part contour" means an input part contour applied to the input device whereas the term "output part contour" means an output part contour produced by the output device and utilized to write as a unit in a typewriter or the like.

According to this invention, there is provided a character writing system comprising input means for selectively designating a part contour forming a Kanji-character, a letter or a symbol, output means for writing a part contour corresponding to the designated part contour and processing means for controlling the relative position of the part contours written by the output means thereby completing a character by combining one or a plurality of part contour sequentially selected and designated by the input means.

BRIEF DESCRIPTION OF THE DRAWINGS

Further features, organizations and advantages of the invention can be more fully understood from the following detailed description taken in conjunction with the accompanying drawings in which:

FIGS. 1a and 1b show two typical Kanji-characters depicted by the conventional method of writing;

FIG. 2a is diagram showing that the width and height of a frame of a Kanji-character are larger or smaller than those of the fundamental body;

FIGS. 2b and 2c show the Kanji-characters shown in FIGS. 1a and 1b which are depicted according to the conception of this invention;

FIG. 2d show a Kanji-character meaning a tree;

FIGS. 3a through 3g show examples of the positional relationship modules of various part contours utilized in this invention;

FIGS. 4a through 4f show one example of the dimensions (width and height) of various part contours utilized in this invention;

FIG. 6 is a block diagram showing one embodiment of the display device of this invention;

DESCRIPTION OF THE PREFERRED EMBODIMENTS

One example of positioning a part contour of Kanji-characters will firstly be described with reference to FIGS. 3a through 3g which shows positional relationship modules of various part contours. The part contours are shown with shadings. In FIG. 3a, the part contour occupies the lefthand portion of the character, in FIG. 3b the righthand portion, in FIG. 3c the upper and both side portions and in FIG. 3d, the lower and both side portions. When the part contour substantially surrounds a character, either form of FIG. 3c or FIG. 3d is used. In FIG. 3e the part contour is located substantially in the center of the character, in FIG. 3f, the part contour occupies upper half or left or righthand half of the upper half, whereas in FIG. 3g, the part contour occupies the lower half or left or righthand half of the lower half of the character. FIGS. 3a through 3g show only several examples and it should be understood that the positional relationship modules can be set in other forms or in more finely devided forms.

FIGS. 4a through 4f show that the part contours have different sizes in which the width and height of the part contours have been limited to some dimensions. In this case the width is classified into ⅓ (FIG. 4a), ⅔ (FIG. 4b), and ½ (FIG. 4c) of the width of the fundamental body shown by dotted lines, and the height is classified into ½ (FIG. 4d) and (FIG. 4e) of the height of the fundamental body. The part contour of "Kanmuri" or "ashi" of a character is located above or below the fundamental body as shown in FIG. 4f. The ratio of the width and height of the part contour is not limited to the values just described but may be suitably selected so long as the appearance and the balance of the character written are not impaired.

For simplicity, in the following description, the width ratios ⅓, ½, and ⅔ and height ratios ½ and 1 are all based on the width and height of the fundamental body.

What type and dimension of the part contour should be selected is determined by considering the possiblity of using a particular part contour for different characters and the appearance of the written character.

Figure 5:
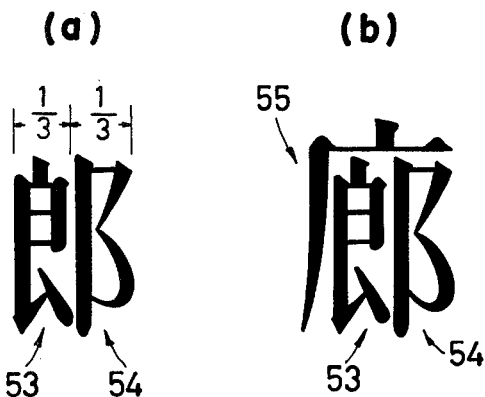
FIGS. 5a and 5b show two typical Kanji-characters written according to this invention.

Regarding this point only one example will be described. A Kanji-character shown in FIG. 5a can be divided into a left part contour 53 and a right part contour 54. The part contour 53 belongs to the type shown in FIG. 3a and it will be noted that segment structure is quite different from that of the part contour 54. The width of the part contour 53 is ⅓ of the fundamental body (FIG. 4a). The part contour 54 belongs to the type shown in FIG. 3b and its width is also ⅓. Accordingly, the width of the Kanji-character shown in FIG. 5a and formed by combining part contour 53 and 54 is ⅔ that of the fundamental body. The Kanji-character shown in FIG. 5b can be divided into three part contours 53, 54 and 55. The part contour 55 has an upper portion and a side portion hanging from the left end of the upper portion as shown in FIG. 3c, the upper portion being located above the fundamental body as shown in FIG. 4f. The part contour 53 and 54 are identical to the part contour shown in FIG. 5a. Consequently, the Kanji-character shown in FIG. 5b is formed by a predetermined combination of three part contours 53, 54 and 55 and is slightly larger than the Kanji-character shown in FIG. 5a. The part contour 53 and 54 can also be used for many other Kanji-characters, whereas the part contour 55 can be used for other Kanji-characters containing a part contour called "madare."

FIG. 6 shows a block diagram showing one embodiment of the character writing system of this invention which comprises an input unit 14 which sequentially designates part contours (input part contours) necessary to write a given character, and a processing unit 15 which controls an output unit 16 in accordance with designated part contours. The output unit 16 writes (for example by printing) respective part contours to write the given character.

Figure 7:
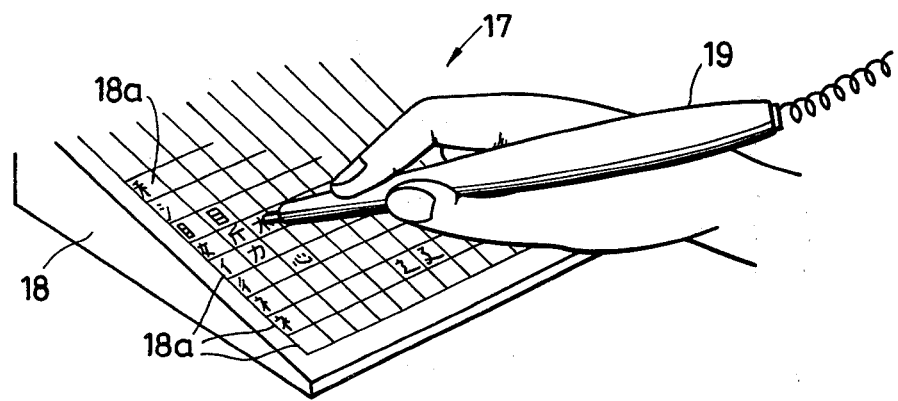
FIG. 7 is a perspective view showing one example of the input part contour selection or designation device utilized in the embodiment shown in FIG. 6.

The input unit 14 comprises an input part contour selector 17 and a code generator 21 which generates a code corresponding to the selected code. The input part contour selector 17 includes a plurality of switches of suitable type (contact or non-contact type) and an input part contour panel 18 which indicates segment structure of respective part contours corresponding to respective switches. These switches and panels can be constituted by a keyboard switch and a keyboard on which segment structures of respective input part contours are marked. Alternatively, a construction (called table look up type or pen touch type) may be used wherein switches corresponding to respective input part contours are arranged in the lower layer of one panel. FIG. 7 shows one example of the input part contour selector 17 in which the table look up type or the pen touch type is adopted. As shown, the input part contour selector comprises an input part contour panel 18 consisting of a suitable array of a plurality of display elements displaying the segment structures of all input part contours that can be selectively written by the writing system of this invention. When the operator place a designating pen 19 on a display element representing a desired input part contour, a switch, not shown, corresponding to the selected part contour will be closed. These switches are provided on the lower side of the panel and may be of a so-called electrostatic coupling type in which a capacitance is formed between the panel 18 and the designating pen 19, or an electro-magnetic induction type in which contacts are contained in the lower layer of the panel 18 which are closed when the designating pen approaches, or a pressure sensitive type in which the contacts are closed by the pressure applied by the pen 19. The switches beneath the panel 18 may be arranged in a matrix.

A space array of the segment structure of each part contour on the input part contour panel 18 is important to facilitate use of the writing system of this invention, that is, to simplifying searching for a desired part contour to be written.

Figure 8:
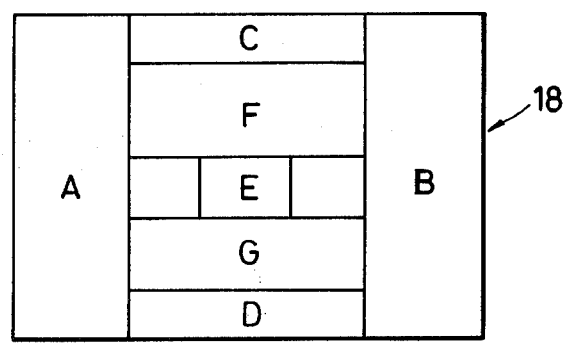
FIG. 8 is a diagram showing the arrangement of the input part contours on an input part contour panel.

According to this invention, the segment structures of respective part contours are arranged on the input part contour panel 18 in a similar positional relationship to the part contours of a character. To explain this array, one example of the array of the input part contours on the panel 18 is diagrammatically illustrated in FIG. 8. The segment structures of the part contours which occupy the lefthand portions of characters are arranged on the lefthand area A of the panel 18, whereas the segment structures of the part contours which occupy the righthand portions of characters are grouped in righthand area B of the panel. Part contours which occupy the uppermost portions of the characters and those hanging from the lefthand or righthand end of the uppermost portion (see FIG. 3c) are grouped in the uppermost area C of the panel 18. The segment structures of the part contours which occupy the lowermost portions of the characters or the left or righthand portion of the lowermost portions (see FIG. 3d) are grouped in the lowermost area D. The segment structures of the part contours which are located at or near the central portion of the characters are grouped at the central area E of the panel 18.

The segment characters which occupy one halves of the upper portions of the characters as shown in FIG. 3f are grouped in an area F beneath the arc C and those occupying the lefthand portions are arranged on the lefthand side of the area F, whereas those occupying the righthand portions are arranged on the righthand side of the area F. The segment structures of the part contours that occupy the lower halves of the characters as shown in FIG. 3g are arranged in an area G just above the area D of which those located at the lefthand side of the lower portions of the characters are grouped at the lefthand side of the area G whereas those at the righthand side of the lower portions are grouped at the righthand side of the area G. The part contours that occupy the entire area of the upper and lower halves of the characters are arranged at the central portion of area F or G, or any other suitable portion.

In Kanji-characters, there are part contours having identical segment structures but located at different portions. Although these part contours are different, the same part contour can be used as the input and output part contours. In such case since the position of the input part contour on the panel is not definite it is difficult to classify it into a specific one of the areas A to G. A specific area or areas are provided at suitable portion of the panel for such part contours.

Thus, for example, part contours corresponding to the radicals ("hen") of the kanji-characters are arranged in the area A, part contours corresponding to "tsukuri" in area B, those corresponding to "tare," ("kanmuri") and "Kamae" in area C, and those corresponding to "Sinnyo," (see FIG. 16a) "ennyo," and "ashi" in the area D. Of course, symbolic portions of the characters and the part contours made of segment structures are different but in the foregoing description they are deemed identical for the sake of ready understanding.

Figure 9:
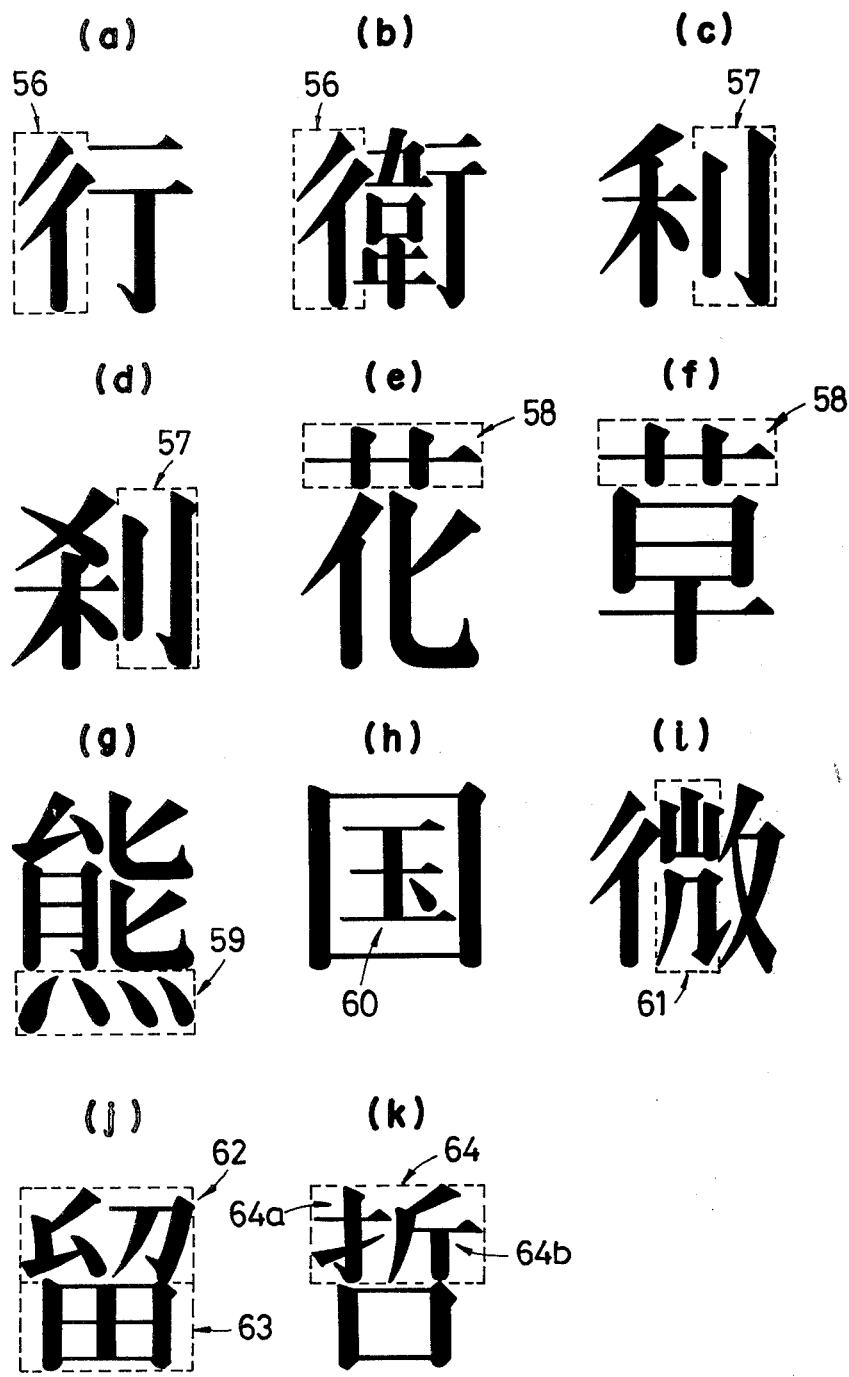
FIGS. 9a through 9k show some typical Kanji-characters of different forms.

More particularly, the part contours to be arranged in area A are part contours 56 at the left end of the Kanji-characters (see FIGS. 9a and 9b), the part contours to be arranged in area B are part contours 57 at the right end of Kanji-characters (see FIGS. 9c and 9d), those to be arranged in area C are part contours 58 at the upper portions of the Kanji-characters (see FIGS. 9e and 9f), those to be arranged in area D are part contours 59 at the lower portions of the Kanji-characters (see FIG. 9g) those to be arranged in area E are part contours 60 inside of the Kanji-characters (see FIG. 9h) or similar part contours 61 at the central portions of the Kanji-characters (see FIG. 9i), those to be arranged in area F are part contours 62 at the upper portion of the Kanji-characters (see FIG. 9j) and those to be arranged in the area G are part contours 63 at the lower portions of the Kanji-characters as shown in FIG. 9j.

A simple character whose input is designated by a single input part contour without dividing the character into a plurality of part contours or a character which is used frequently is marked on the panel 18 as its entire segment structure. To accommodate these characters, an area is selected at about the center or any other desired position of the panel 18. The Japanese "Kana" character, English alphabets, digits and other symbols are also grouped in a suitable area of the panel 18. This area is not shown. Where it is advantageous to write letters or symbols other than Kanji-characters by dividing them into a number of part contours they are of course arranged on the panel as in the form of part contours. When dividing them into a number of part contours the possibility of common use for different letters should also be considered as in the case of Kanji-characters.

The mode of arrays of the part contours in each area of the panel 18 can be selected as desired. However, it is desirable to arrange them according to a rule for facilitating searching. For example, the part contours may be grouped according to their widths, ($\frac{1}{3}$, 2/2 and $\frac{1}{3}$).

With the part contours selector 17 described above, when the operator wishes to designate a desired input part contour he designates the segment structure of the desired input part contour on the panel 18 (or of the key top of a keyboard) with the designating pen 19 or by pressing the segment structure with a finger thus closing a switch corresponding to the selected part contour. Then, a signal is produced on one of the output lines 20 corresponding to the selected part contour and the signal is applied to the code generator 21, whereby the code generator 21 generates a code signal PD corresponding to the selected part contour. The code generator 21 may be constituted by a suitable encoder or a counter.

The writing system of this invention is constructed such that the input part contours are designated according to the ordinary order of writing the part contours. As a rule, the part contour at the upper portion of a character is designated earlier than the part contour at the lower portion, and the part contour at the lefthand side is designated earlier than the part contour at the right-hand portion. Of course, there are some exceptions.

The code signal PD produced by the input unit 14 in accordance with the designation of the desired part contour contains the following informations. More particularly, it contains an information (code $PD_1$) that descriminates the selected part contour from other part contours, an information (code $PD_2$) concerning the positional relationships and the size that is nature of the selected part contour, and an information ($PD_3$) which is necessary to control the writing operation. The information represented by the code $PD_3$ designates whether the part contour has been designated as the first part contour in a character or as the last. The code signal PD generated by the input unit 14 performs an important role when during the control of the writing operation. Especially, the code signal PD is important for judging completion of a character, or the starting and termination thereof and for combining a number of part contours according to a prescribed order at the output stage, for example by typewriting.

Figure 10:
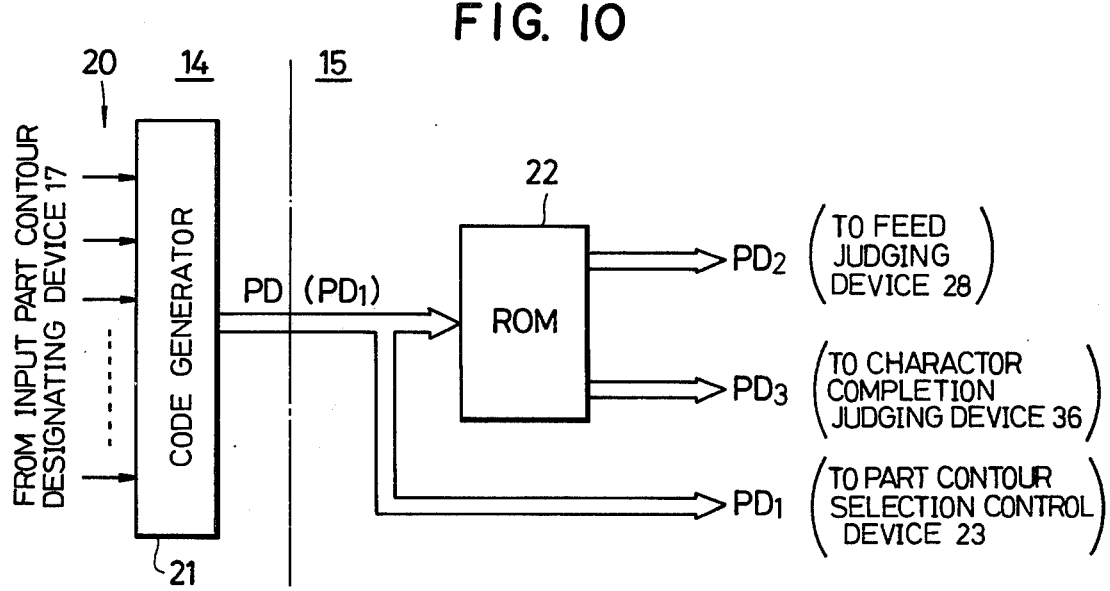
FIG. 10 is a block diagram showing modified circuit arrangement for generating various codes adapted to control writing operations.

Of course, the code signal PD generated by the code generator 21 may not contain all informations $PD_1$, $PD_2$ and $PD_3$. For example, as shown in FIG. 10, the code generator 21 may be constructed to generate only the code $PD_1$ which discriminates one part contour from other part contours and a suitable read only memory device 22 may be provided for the processing unit 15 so as to read out codes $PD_2$ and $PD_3$ corresponding to the part contours represented by the code $PD_1$ from the memory device 22.

The positional relationship, size and the order of designation of the part contour are not different for respective characters but the part contours are classified according to their common characteristic. The areas of the panels are arranged according to the common characteristic. Such arrangement of the areas does not differ substantially from that shown in FIG. 8. With this arrangement, it is possible to quickly and readily judge the positional relationship and the size of the designated part contour at a glance of the areas. Moreover, completion of the selected character can also be readily determined. In these cases, information which represents the areas in which the designated input contour is contained can be used instead of the code $PD_2$ and $PD_3$. All part contours arranged on the display panel are assigned with different identifying codes $PD_1$.

The code $PD_2$ concerning the positional relationship and the size of the part contour is utilized to control the writing (typing) positions of respective output part contours at the output device 16 for producing a desired combination of the part contours so that codes of a suitable type (content) should be selected according to the construction of the output device. One example of the type of the code $PD_2$, that is, the information content represented by the code $PD_2$ is as follows:

1. The code assigned to a part contour having a width of ⅓ and a height of 1 (see FIG. 4a) — "001"
2. The code assigned to a part contour having a width of ⅔ and a height of 1 (see FIG. 4b) — "010".
3. The code assigned to a part contour having a width of ½ and a height of 1 (see FIG. 4c) — "011."
4. The code assigned to a part contour occupying the upper half of a character and having a width of ⅔ and a height of ½ (see FIGS. 4d and 3f) — "100."
5. The code assigned to a part contour occupying the righthand portion of the upper half of a character and having a width of ⅓ and a height of ½ (see FIGS. 4d and 3f) — "101."
6. The code assigned for a part contour occupying the lower half of a character and having a width of ⅔ and a height of ½ (see FIGS. 4d and 3g).
7. The code assigned to a part contour occupying the righthand portion of the lower half of a character and having a width of ⅓ and a height of ½ (see FGIS. 4d and 3g). — "111"
8. The code assigned to a part contour slightly projecting beyond the upper, lower left or right side of the fundamental body shown y dotted lines in FIG. 4. (see FIGS. 3c and 3d) — "000."

As above described, there are eight types of codes $PD_2$ concerning the position and size of the part contour and each code comprises three bits. Of coure, there are many types of the code. In this embodiment the same code "001" as item 1 is assigned to the part contours occupying the lefthand side of the upper or lower half of the character and having a width of ⅓ and a height of ½.

The code $PD_3$ adapted to judge the beginning and termination of a character is classified into the following four types.

1. A code showing that a part contour is always designated at the end of a character. — "01"
2. The code showing that a part contour is always designated at the beginning of a character — "10."
3. A code showing that a part contour is never designated at the beginning or at the end of a character — "00."
4. A code showing that a part contour is designated at the beginning or end of a character in one case and at a intermediate point of the character in the other case — "11."

Which part contour belongs to which one of the four items can be determined by analyzing many Kanji-characters.

The judgment of the beginning and end of a character (that is completion thereof) can not be made solely by the four items described above but greatly depends on the manner of setting the part contours. Where a character is to be completed by sequentially designating a plurality of part contours it is important to write characters with a proper spacing so that the completed characters can be well discriminated without applying any input by means of special spacing keys. Such automatic inter-character spacing can be made by judging the completion of respective charactors. Accordingly, it is necessary to provide a judging item that enables to provide automatic inter-character spacing regardless of the type of the characters to be written. For this reason, aforementioned four judging items are only one example and are not critical to the judgment of the completion of the characters. Such judging items are determined by analyzing all Kanji-characters that can be written according to this invention, that is the analyis of the special setting of the part contours which enables efficient writing of the given character with a minimum number of the part contours.

The part contour identification code $PD_1$ is applied to an output part contour selection control device 23 of the processing unit 15 so as to control the output device 16 to write the output part contour corresponding to the designated input part contour. In this embodiment, typewriter type elements corresponding to the output part contours are used and the output device 16 is constructed to write a character by printing such types.

The output part contour selection control device 23 functions to select a required output part contour in accordance with the input part contour which is represented by the input code $PD_1$ and reads the input code $PD_1$ for producing an output which selects the desired output part contour. For example, the output part contour selection control device 23 is formed by a simple logical circuit or decoder.

Since it is possible to suitably control the printing position of the character it is not necessary to so strictly determine the positions of the output part contours as in the input part contours. For this reason, it is not necessary for the output part contour to exactly correspond to the input part contour. If it is advantageous to increase the possibility of using a part contour for different characters and to decrease in the number of the part contours, it is possible to write a part contour corresponding to one input part contour by two output part contours respectively corresponding to two part contours obtained by dividing one input part contour into two. For example, when the upper half part contour 64 of the character shown in FIG. 9k is designated as one input part contour, the output part contour may comprise two part contours, that is the part contour 64a at the lefthand side of the upper half and the part contour 64b at the righthand side of the upper half.

Figure 11:
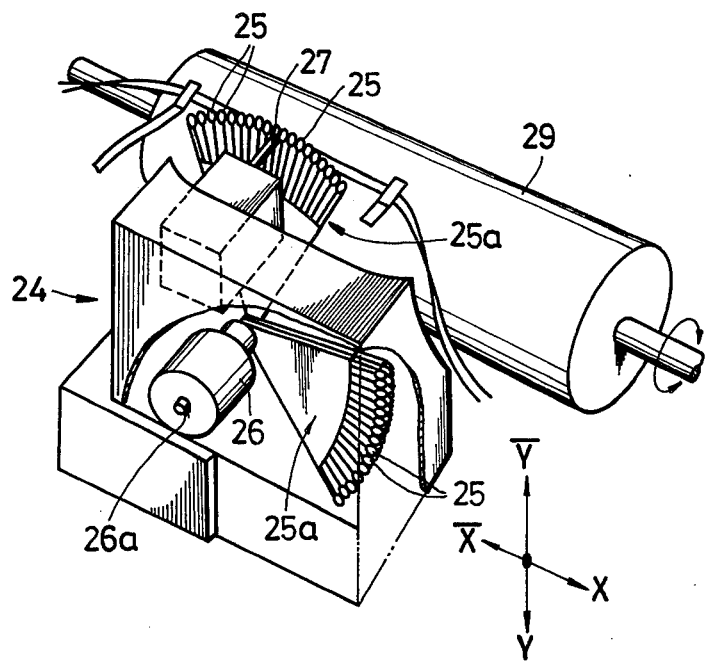
FIG. 11 is a perspective view showing one example of typewriter and its platen.

The type unit 24 of the output unit 16 comprises an output part contour selecting and driving device 26 which selects a type element 25 of the output part contour designated by the output of the output part contour selection control device 23 and moves the selected type element to a printing position and a hammer 27 for printing the selected type element on a recording medium (for example, paper) when the type element is moved to a predetermined printing position and has stopped at that position. FIG. 11 shows the arrangement of these elements. The output part contour selecting and driving devices 26 quickly responds to the selecting command from the output part contour selection control device 23 thus selecting the type element 25 of a predetermined part contour. The driving device 26 rotates a shaft 26a to rotate the type element of the selected part contour to the printing position. As shown in FIG. 11, type elements 25 for a plurality of output part contours are arranged along an arcuate sector 25a which is rotated when the shaft 26a rotates. The hammer 27 is actuated when a selected type element 25 is brought to the printing position.

Concurrently with the application identification code PD$_1$ to the output part contour selecting control device 23 of the processing unit 15 a code PD$_2$ concerning the positional relationship and the size of the corresponding part contour is applied to a feed judging device 28 which controls the printing position in accordance with the code PD$_2$ so as to combine various part contours in a predetermined pattern to form a desired character. In this embodiment, the feed is controlled such that after printing a given part contour on the recording medium, the type unit 24 is shifted in the horizontal or vertical direction over a distance corresponding to the size of that part contour. Consequently, the feed judging device 28 applies a necessary feed command to the printing position control device 30 of the output unit 16 by reading the content of the code PD$_2$ concerning the positional relationship and the size of the part contour. After completing the printing of a given part contour, the printing control device 30 shifts the type unit 24 in response to the feed command.

One example of the relationship between the code PD$_2$ and the feed operation of the type unit 24 is shown in the following Table 1 and FIG. 12.

Table 1

Figure 12:
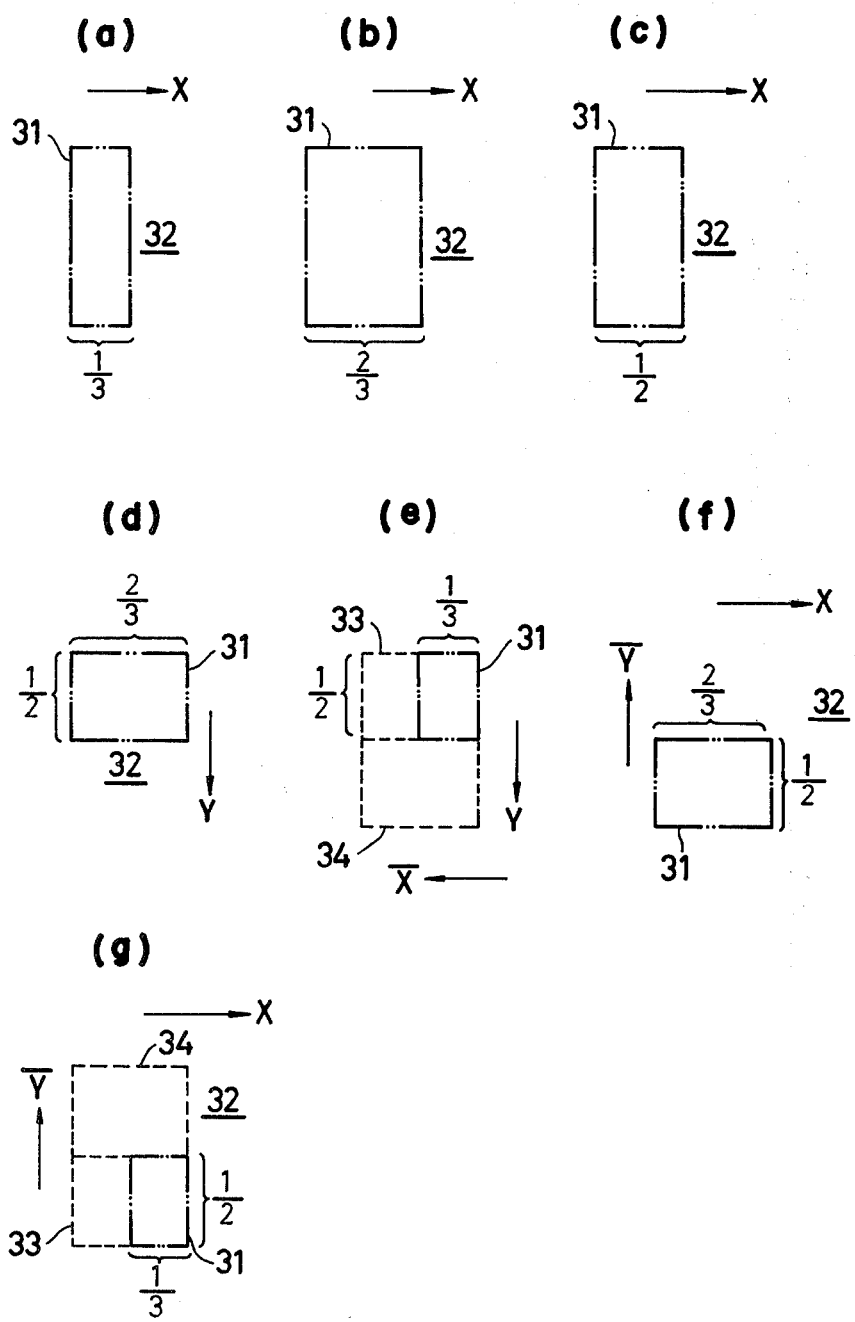
FIGS. 12a through 12g are diagrams useful to explain the relationship between the writing positions of part contours to be written and the feed operation of a typewriter.

| Code PD$_2$ | Content of feed operation | FIG. 12 |
| --- | --- | --- |
| 001 | feed the type unit to right by $\frac{1}{3}$ | a |
| 010 | feed the type unit to right by $\frac{2}{3}$ | b |
| 011 | feed the type unit to right by $\frac{1}{2}$ | c |
| 100 | feed the type unit toward lower by $\frac{1}{2}$ | d |
| 101 | feed the type unit to left by $\frac{1}{3}$ and toward lower by $\frac{1}{2}$ | e |
| 110 | feed the type unit to right by $\frac{2}{3}$ and toward upper by $\frac{1}{2}$ | f |
| 111 | feed the type unit to right by $\frac{1}{3}$ and toward upper by $\frac{1}{2}$ | g |

Table 1-continued

| Code PD$_2$ | Content of feed operation | FIG. 12 |
| --- | --- | --- |
| 000 | the type unit is not moved. | |

Where the positional relationship and size code PD$_2$ is "001" since the width of the part content is $\frac{1}{3}$, after printing the part contour, the type unit 24 is fed to the right by $\frac{1}{3}$ as shown by arrow x in FIG. 12a thus enabling to print the next part contour to the position 32 to the right of the printed part contour shown by a dot and dash frame 31 FIGS. 12b and 12c show that when the printed part contour has a width of $\frac{2}{3}$ or $\frac{1}{2}$, the type unit 24 should be fed to the right by $\frac{2}{3}$ or $\frac{1}{2}$ respectively. Where the positional relationship and size code PD$_2$ is "100," since the printed part contour has a width of $\frac{2}{3}$ and a height of $\frac{1}{2}$ and occupying the upper half of a character, the next part contour should be printed beneath the printed part contour. Consequently, as shown in FIG. 12d after printing a given part contour, the type unit 24 is fed toward lower (in the direction of arrow Y) by $\frac{1}{2}$ thereby enabling to print the next part contour occupying the lower half of the character.

A PD$_2$ code "101" means a part contour occupying the righthand portion of the upper half of a character and having a width of $\frac{1}{3}$ and a height of $\frac{2}{3}$ so that this part contour should be printed in the frame 31 shown in FIG. 12e. To the left thereof the part contour occupying the left portion of the upper half has already been printed as shown by dotted line frame 33. Consequently, after printing the part contour shown by the dotted line frame 31 the type unit 24 is fed toward left (shown by $\bar{x}$ arrow) by $\frac{1}{3}$ and toward lower (as shown by arrow Y) by $\frac{1}{2}$ thus printing the part contour of the lower half beneath the part contours 33 and 31 of the upper half as shown by a dotted line frame 34. When the code PD$_2$ is "110" the part contour (frame 31) occupied the lower half so that the type unit 24 is shifted to the right (as shown by arrow x) by $\frac{2}{3}$ which is equal to the width of the part contour and toward upper by $\frac{1}{2}$ as shown by arrow $\bar{Y}$. Accordingly, the type unit 24 is moved to the upper right portion 32. When the code PD$_2$ is "111" the part contour shown by dotted line frame 31 occupies the righthand portion of the lower half of a character and portions to the left and above thereof (shown by frames 33 and 34) have already been printed with part contours. Consequently, after printing the part contour 31 the type unit 24 is moved to the right by $\frac{1}{3}$ as shown by arrow x and to the upper by $\frac{1}{2}$ as shown by arrow $\bar{Y}$ thus moving the type unit 24 to the right upper portion 32. When the code PD$_2$ is "000" the type unit 24 would not be moved. This condition corresponds to part contours which project upwardly or downwardly beyond the fundamental body as shown in FIG. 3c and the type of the part contour subsequently designated will be printed in a vacant portion.

The feed controls as shown in FIGS. 12d through 12g are effective when the type of a part contour occupying the lower half portion has the same height as the part contour occupying the upper half. Where the height of the type of the part contour occupying the lower half is lower by $\frac{1}{2}$ than the type of the part contour occupying the upper half according to the position of the part contour, the feed control may be in the lateral direction (arrow x or z) for the codes "100" through "111" (FIGS. 12d through 12g) and the type unit need not be moved in the vertical direction (Y and $\bar{Y}$ directions).

In response to the feed command applied to the printing position control device 30 from the feed judging device 28, the printing position control device 30 quickly moves the type unit 24 in a predetermined direction by a predetermined amount. Since such control of the movement of the type unit is well known in the art of printing, detailed description thereof is believed unnecessary. Instead of moving the type unit 24, the platen 29 may be moved.

A character completion judging device 36 of the processing unit 15 is supplied with code $PD_3$ for judging the beginning and end of the characters so as to judge the beginning and end of the characters in accordance with the content of the code $PD_3$. The character completion judging device reads the content of the applied code $PD_3$, and executes the following four controls in accordance with the result of reading:

1. When a given part contour is designated at the last in any Kanji-character, that is when the code $PD_3$ is "01," a space command signal $S_1$ is sent to the printing position control device 30. In response to the space command signal $S_1$ the printing position control device 30 moves to the right the type unit 24 by a suitable space after the printing of that part contour has been completed and the feed operation of the type unit 24 by the feed judging device 28 has completed. In this manner, as the space S between adjacent characters is automatically provided, it is possible to clearly discriminate respective printed characters.

2. Where a part contour is firstly designated in any Kanji-character, in other words, when the code $PD_3$ is "10" and where no inter-character space is provided after an immediately preceding character, a space command signal $S_2$ is sent to the printing position control device 30. In response to the space command signal $S_2$, the printing position control device 30 moves the type unit 24 to the right by predetermined space before printing the output part contour corresponding to said part contour. In this manner, a space is provided between a preceding printed character and a character printed thereafter.

3. Where a character is not designated at the beginning and the end of any Kanji-character, in other words, where it is designated at an intermediate point of the writing step of the character, that is when the code $PD_3$ is "00," the space is not provided.

4. Where a part contour is designated not only at the beginning or end but also at an intermediate point, that is when the code $PD_3$ is "11," a space command signal $S_2$ is produced by an offer signal W from a memory-operation device 37.

Of course, the term "space" herein used means a space between adjacent printed character or symbols and the actual space provided by the generation of the space command signal $S_1$ or $S_2$ will be described later with reference to FIG. 15.

The memory-operation device 37 comprises a memory device, a register, a comparator and other logic circuits and constructed such that it receives a code signal PD (or $PD_1$) of a designated part contour supplied from the input unit 14, to hold the input code signal PD in the register, and to compare the order of the designated part contour in relation to its preceding and succeeding part contour with the data which have been stored in the memory device to judge the beginning and end of a character so as to apply an offer signal W to the character completion judging device 36. Thus, when the character completion judging device 36 fails to judge, the memory operation device 37 judges the beginning or the end of a character thereby completing the same.

The writing system of this invention operates to write (print) desired characters in the following manner.

Suppose now that a series of Kanji-characters shown in FIG. 15g are to be written. At first, by using the input part contour display panel 18 of the input unit 14, respective part contours are sequentially designated according to the prescribed order of writing shown in FIGS. 13a through 13g. The part contour shown in FIG. 13g constitutes a character by itself.

Figure 13:
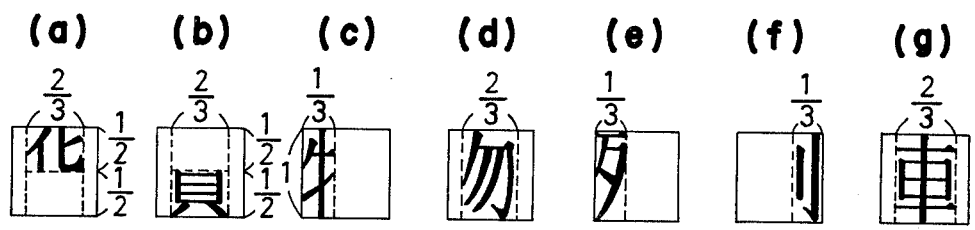
FIGS. 13a through 13g show one examples of inputs part contours which are utilized to write four Kanji-characters shown in FIG. 15g having a meaning of a "good train;"

The type elements 25, or the output part contours are selected to correspond respective designated input contours. In this embodiment, the type elements 25 are constructed such that the lefthand edges of the part contours printed on the recording medium (paper, etc.) will coincide with the lefthand edges (shown by dot and dash lines) as shown in FIGS. 14a through 14g. Accordingly, after shifting the type unit 24 to the right by an amount equal to the width of the printed part contour, the next part contour is printed. Then, the lefthand edge of the printed part contour will substantially coincide with the righthand edge of the part contour previously printed. As a consequence, two adjacent printed part contours will be contiguous. In the example described hereunder, the type of the part contour shown in FIG. 13a and that shown in FIG. 13b have substantially the same height as shown by the upper edges u shown in FIGS. 14a and 14b. As a consequence, the position and size code $PD_2$ of the input part contour shown in FIG. 13a is "100" which designates the feed operation shown in FIG. 12d. The code $PD_2$ of the input part contour shown in FIG. 13b is "110" that designates the feed operation shown in FIG. 12f. The code $PD_2$ of the input part contour shown in FIG. 13c is "001" showing a feed of ⅓ toward right, whereas the code $PD_2$ of the input part contour shown in FIG. 13d is "010" showing a feed of ⅔ toward right. The code $PD_2$ of the input part contour shown in FIGS. 13e and 13f is "001" showing a feed of ⅓ to the right while the code $PD_2$ of the input part contour shown in FIG. 13g is "010" showing a feed of ⅔ to the right. The codes $PD_3$ of the input part contours shown in FIGS. 13b, 13d and 13f are respectively "01" which shows the end of one character. The code $PD_2$ of the input part contour shown in FIG. 13g is also "01" showing the end of a character.

Figure 14:
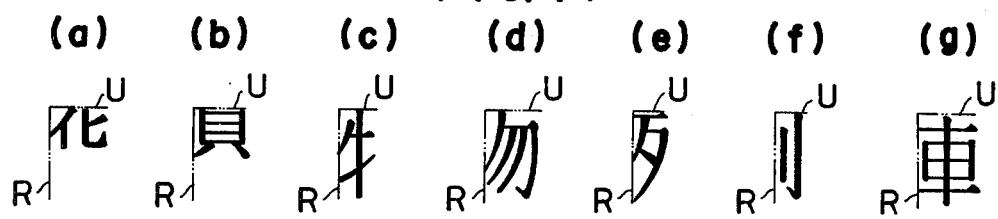
FIGS. 14a through 14g show the output part contours corresponding to the input part contours shown in FIGS. 13a through 13g.
Figure 15:
FIGS. 15a through 15g are diagrams showing the manner of successively printing (writing) the output part contours shown in FIGS. 14a through 14g at predetermined printing positions in accordance with the input part contours shown in FIGS. 13a through 13g.

Thus, according to the order of input designations, an output part contour shown in FIG. 15a is first printed and then the type unit 24 is moved downwardly by ½. At this time the input part contour shown in FIG. 14b is printed as shown by FIG. 15b. Thereafter, the type unit 24 is moved by ⅔ to the right, and then ½ toward upper. Furthermore, the type unit 24 is moved slightly to the right to provide an inter-character space S. Then, the input part contour shown in FIG. 14c is printed as shown in FIG. 15c followed by a ⅓ movement of the type unit 24 to the right. Then the input part contour shown in FIG. 14d is printed as shown in FIG. 15d and the type unit 24 is moved ⅔ to the right. Thereafter, the type unit 24 is moved a little toward right to provide an inter-character space S. Then, the input part contour shown in FIG. 14e is printed as shown in FIG. 15e and the type unit 24 is moved ⅓ to the right. Thereafter, the input part contour shown in FIG. 14f is printed as shown in FIG. 15f and the type unit 24 is moved by ⅓ to the right followed by a little movement necessary to provide an inter-character space S. Then, the input part contour shown in FIG. 14g is printed as shown in FIG. 15g and the type unit 24 is moved by ⅓ to the right followed by a little movement necessary to provide an inter-character space S. Then, the input part contour shown in FIG. 14g is printed as shown in FIG. 15 and the type unit 24 is moved ⅔ to the right followed by a slight movement in the same direction, thus providing an inter-character space S.

As above described, when the operator sequentially designates the part contours of the Kanji-characters desired to be printed according to a prescribed order of writing, the desired characters are automatically printed according to said order as shown in FIGS. 15a through 15g. Moreover, as the type unit 24 is automatically shifted by the space S between adjacent characters, the printed characters can be clearly identified. The amount of the space can be adjusted as desired.

Figure 16:
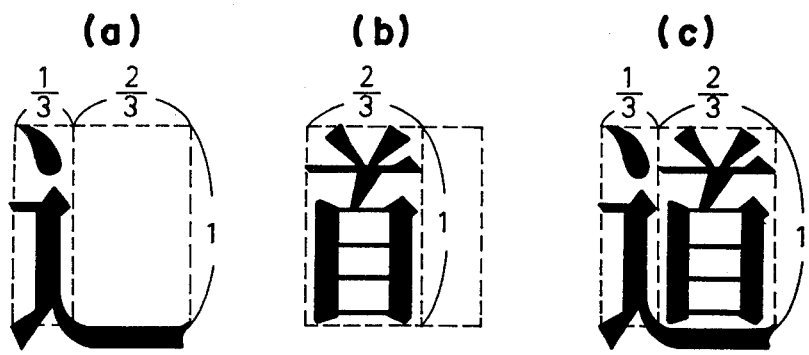
FIGS. 16a through 16c are diagrams showing the steps of displaying a Kanji-character including a radical indictive of intensity (shinyo)
Figure 17:
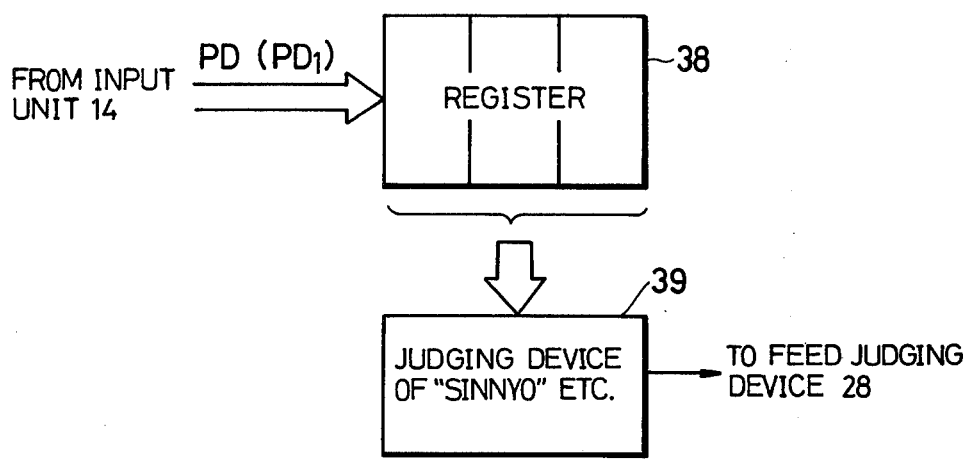
FIG. 17 is a block diagram showing one example of an electric circuit utilized to control the writing operation of a Kanji-character including a "Shinnou" or an "nnyo"

The order of writing a Kanji-character containing a part contour called "shinnyo" or "ennyo" is that the "Shinnyo" or "ennyo" is written at the last, but the upright portion of the part contour "shinnuo" and "ennyo" occupies the lefthand side portion of the character. For this reason, a part contour to be combined wth the part contour "shinnyo" or "ennyo" must be printed firstly such that the upright portion should be spared from the part contour. To this end, it is necessary to provide a special control circuit for controlling the printing operation of the Kanji-characters including a "shinnyo" or "Ennyo". However, this problem can be solved by firstly designating the part contour corresponding to the "shinnyo" or "ennyo" without providing such special control circuit. For example, in a case of printing a Kanji-character shown in FIG. 16c, at first the part contour shown in FIG. 16a is designated so as to print it by the output unit 15. Assuming that the lefthand upright portion has a width of ⅓, the type unit 24 is shifted ⅓ to the right. Then, the part contour shown in FIG. 16b and having a width of ⅔ is designated and printed, thus completing the kanji-character shown in FIG. 16c. As the horizontal portion of the "shinnyo" lies on the outside of the fundamental body, a well balanced character can be printed as shown in FIG. 16c.

Where it is desired to firstly designate a part contour corresponding to the "shinnyo" or "ennyo" according to the ordinary order of writing, a register 38 including a number of stages (2 or 3) is provided as shown in FIG. 17 so as to store several input codes PD (or $PD_1$) which are designated sequentially and the PD codes stored in the register 38 are judged by a judging device 39 for applying a signal to the feed control device 28 shown in FIG. 6 when the character includes a "sinnyo" or "ennyo" such that the part contour to be combined therewith will be printed with a space between it and the upright portion of the "shinnyo" or "ennyo", or that the part contour of the "shinnyo" or "ennyo" will be printed firstly. It is also possible to construct the memory-operation device 37 to have the ability of judging the "shinnyo" and "ennyo".

The part contours corresponding to the "sonyo" of the body or the "bennyo" other than the "shinnyo" and "ennyo" are designated at the beginning of the characters, so that it is not necessary to judge the "nyo" at the judging device 39. In other words, it is sufficient to print the output part contours according to the order of designating the input part contours.

Figure 18:
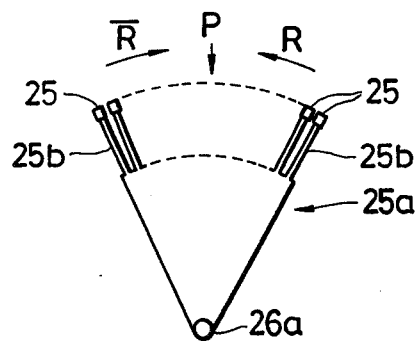
FIG. 18 shows one example of a sector carrying part contour types.

One example of the arrangement of the type elements 25 of the type unit 24 is shown in FIG. 18. Thus, the type elements 25 of respective part contours are mounted on the arcuate periphery of a sector 25a connected to the output part contour selecting and driving device 26 shown in FIG. 6 via a drive shaft 26a. Each type element 25 is mounted on the free end of an arm 25b. When the sector 25a rotated on the shaft 26a in the direction of arrow R or R̄ by a suitable angle, a type element of desired part contour can be selected at the printing position P. It is advantageous to mount all type elements on a plurality of sectors 25a instead of one since in the latter case the length of the arc becomes too long thus increasing the size of the type unit 24. Where a plurality of sectors 25a are used to mount type elements, the length of the arcuate periphery of the sectors is decreased thus enabling miniaturization of the type unit. Moreover, as the number of type elements per one sector decreases, the response speed of selecting a desired type element can be increased.

Although it is possible to mount all sectors 25a on a common drive shaft, a plurality of drive shafts can also be used as long as their printing positions P are aligned. Furthermore, it is advantageous to mount type elements corresponding to part contours having the same width on the same sector. With this construction, when one of the sectors is selected for selecting a type element, the amount of the lateral movement of the type unit will be constant so that is is not necessary to include information regarding the amount of lateral movement in the code $PD_2$, thereby not only decreasing the bit number of the code $PD_2$ but also simplifying the construction of the feed control device 28.

Where a plurality of sectors 25a are mounted on a common drive shaft, any suitable mechanism can be used for selectively driving a given sector. For example, a cam may be used for selecting a desired sector and connecting it to the drive shaft. Alternatively, a clutch may be provided for selectively connecting a selected sector to the drive shaft 26a.

The type unit 24 is not limited to the illustrated construction. Thus, any suitable mechanism such as a type wheel, a type drum or a type belt which are commonly used in printing machines can be used in the output unit of this invention. Furthermore, like a conventional Japanese typewriter, type elements of various part contours may be stored in a type box and a desired one may be selected and printed. Alternatively, each type element of a part contour may be mounted on one end of a type bar as in a western typewriter so as to print the type element by driving the type bar.

Figure 19:
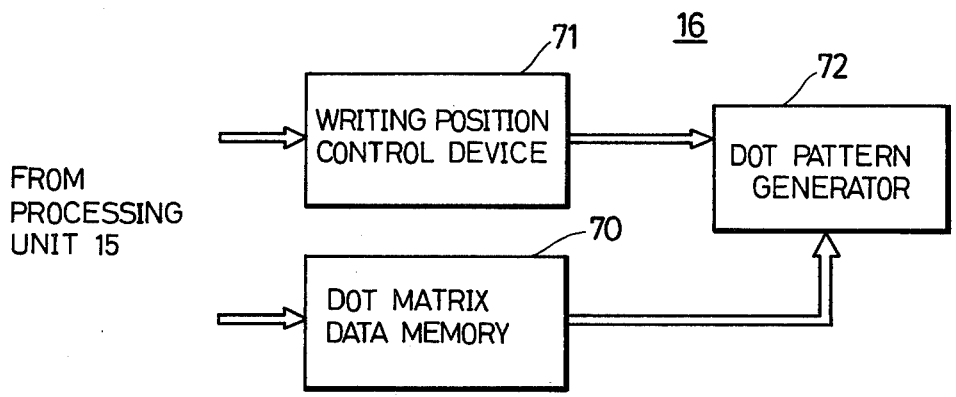
FIG. 19 is a block diagram showing one example of using a dot matrix system as the output device.

Instead of using printing type elements in the output unit 16, a dot matrix system can also be used.

Where the dot matrix system is adopted for the output unit 16, as shown in FIG. 19, an output part contour selection data supplied from the output part contour selection control device 23 in accordance with a code signal $PD_1$ representing an input part contour is applied to a dot matrix data memory device 70, and a part contour dot matrix data corresponding to an output part contour is derived out from the memory device 70.

A dot pattern generator 72 generates a dot pattern of a given part contour in accordance with the dot matrix data generated by the dot matrix data memory device 70. At that time, a writing position control device 71 controls the position of generating the dot pattern in accordance with the part contour writing position controlling information supplied from the processing unit 15.

The output unit 16 may also be constructed as a line printer instead of a printer. In this case, the designation of an input part contour is not in a real time relationship with the printing of an output part contour and this sytem is effective where such recording medium as a paper tape or a magnetic tape or a computer is used.

The printing system of the output unit 16 is not limited to an impact type described above but a non-impact type such as electrostatic type, electric discharge type, heat sensitive type, ink jet type and X-Y blotter type can also be used.

Figure 20:
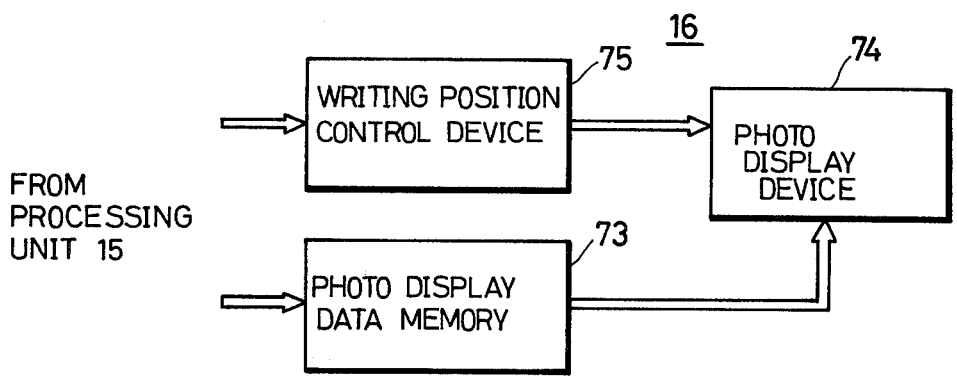
FIG. 20 is a block diagram showing one example in which a soft copy display device is utilized as the output device.

Furthermore, the invention is not limited to the printing of characters on the recording medium by using the impact type or non impact type, but a display device designed for obtaining soft copies may be used as the output unit 16. For example, it is also possible to use a television system, cathode ray display tube, a photoelectric display board or liquid crystals.

Where a display device for soft copies are used as the output unit 16, it can be constructed as shown in FIG. 20. Thus, a photo display data memory device 73 is used to store photo display data for displaying respective part contours by light, and an output part contour selection data supplied from the output part contour selection control device 23 in accordance with a code signal that represents an input part contour is applied to the photo display data memory device 73 for producing a photo display data corresponding to the output part contour. In response to the photo display data produced by the memory device 73 the photo display device 74 displays by light the output part contour. At this time, the display position control device 75 controls the display position of the photo display member of the photo display device 74 in accordance with a part contour display position controlling information given by the processing unit 15.

Figure 21:
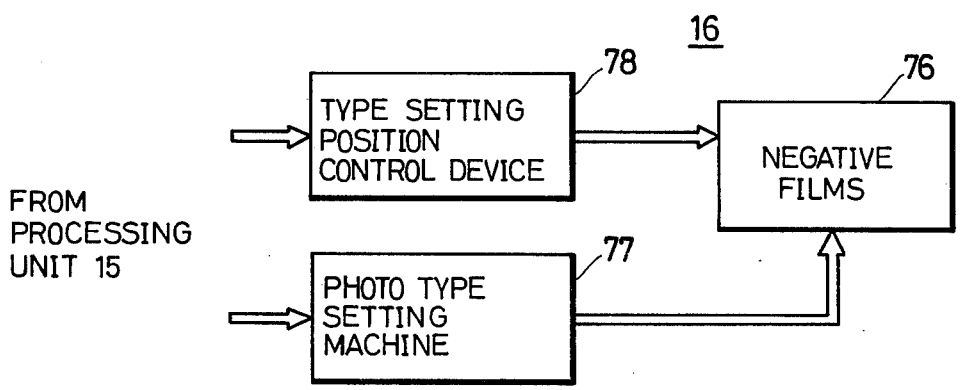
FIG. 21 is a block diagram showing one example wherein a phototype setting system is used as the output device.

It is also possible to use a phototype setting machine as the output unit 16 wherein negative films for the phototype setting machine are substituted for the types 25. The negative films for the part contours is mounted on a sector like the sector 25a shown in FIG. 18. In FIG. 21 the output unit 16 of this modification comprises negative films 76 corresponding to respective part contours, an optical phototype setting machine 77 for selecting a negative film corresponding to a selected and designated part contour and a printing position control device 78 which controls the position of printing the negative film 76 in accordance with the part contour display position controlling information given by the processing unit 15.

Regardless of the type of the output display system utilized in the output unit 16, each part contour is written as a unit according to the teaching of this invention. In any case, printing types, negative films and the printing control of the dot matrix are formed or processed with all part contours formed as units. Each character, especially a Kanji-character written is not limited in a fixed frame but has a flexible body size.

The platen 29 utilized in the output unit 16 may take various forms other than cylindrical. For example, it may take the form of a flat sheet or a portion of an arc having a large radius of curvature. Of course, when changing the line, the platen 29 is fed upwardly and the type unit 24 is returned to the starting position thus beginning the printing of a new line as is well known in the art. Instead of printing along horizontal lines writing along vertical lines is also possible.

Of course, the input unit 14, the processing unit 15 and the output unit 16 may be combined into an integral unit having a size comparable with that of a western typewriter. Furthermore, it is possible to use the input and output units of the invention as the input and output terminal devices of an electronic computer. In such case, the writing system of this invention in which a part contour comprising a portion of a Kanji-character is processed as a unit in the work information processing system of the computer. The writing system of this invention is also applicable to a Kanji-character teletype system in which case the part contour code signal PD(or $PD_1$) generated by the input unit 14 is transmitted through a data transmission line and a processing unit 15 and an output unit 16 are connected to the receiving end. It is also possible to record the code PD concerning an input part contour and generated by the input unit 14 on a paper tape or a magnetic tape. Where a cassette recorder is incorporated, it is possible to record and reproduce characters as desired.

Where the number of the characters to be written is limited, it is possible to mechanically interconnect corresponding keys and types as in an ordinary typewriter.

While in the foregoing embodiment writing of Kanji-characters has been described, it should be understood that the invention is also applicable to print or write any character, letter or symbol. Accordingly, the term "Kanji-character" utilized in the specification and claims covers all such characters. However, the invention is especially useful in countries using Kanji-characters as in Japan, China and Korea.

The invention is also applicable to more simple letters as Japanese "Kana" letters, and English alphabets.

As above described, according to this invention, since the same part contour is used in common for writing different characters, it is possible to greatly simplify the input and output units. The result of analysis shows that it is possible to write about several thousands of Kanji-characters by using only several hundreds of the part contours. Each part contour has a specific size, segment structure or even a specific position and by merely sequentially designating a plurality of part contours according to a conventional order of writing, a desired character can be written with respective part contours positioned at prescribed positions. Moreover, it is not necessary to particularly designate the beginning and the end of the character. The part contours designated in the input unit are not used for searching the memories in a computer as has been the practice, but merely used to designate corresponding output part contours utilized to write characters so that it is not necessary to use bulky and expensive computer system. When the writing system of this invention is applied to a computer, the computer is not required to use a large capacity memory device for storing respective Kanji-characters and the input part contour codes can be used directly for information processing. Since the segment structures of respective part contours are arrayed on the input part contour panel at positions similar to those occupied by the part contours in the actual Kanji-characters, the designation of the input part contours can be made easily.

Thus, according to this invention, by designating only few part contours which are arranged on the input panel at similar positions as in the actual Kanji-characters according to a conventional order of writing Kanji-characters, respective characters can readily be written or printed. Thus, even an unskilled person can readily use the writing system of this invention.

Different from a conventional Kanji-character input and output devices, according to this invention it is possible to greatly simplify and miniaturize the input, processing and output units thus providing inexpensive writing system. Where such logical element as a one chip C.P.U. (computer processing unit) utilizing LSI or masking - ROM or RAM is used, the writing system of this invention can be manufactured at a low cost by a mass production process.

What is claimed is:

1. A character writing system comprising:
    input means for selectively designating one or more part contours each of which is an independent component of a non-alphabetic character and has predetermined concrete size and form or profile,
    output means for sequentially writing part contours corresponding to said designated part contours in the order of designation, and
    character completion control means for judging completion of writing of one character by the sequentially designated part contours and, if said one character has been completed, controlling said output means so as to provide a space between said character and the next to be written character or part thereof.

2. The writing system according to claim 1 wherein said input means comprises a plurality of part contour indicating members respectively representing said part contours, an input panel on which said part contour indicating members are arranged, and means for selectively designating said part contour indicating members, said part contour indicating members being grouped according to their characteristics including their concrete size and their relative positions in one complete character.

3. The writing system according to claim 2 wherein groups of the part contour indicating members are respectively arranged in areas on said panel corresponding to the positions of respective part contours in the non-alphabetic characters.

4. The writing system according to claim 2 which further comprises a plurality of switches associated with respective part contour indicating members, and means for actuating said switches when the part contour indicating members associated therewith are designated.

5. The writing system according to claim 1 wherein said input means comprises means for generating a code signal corresponding to a designated part contour and means for supplying said code signal to said output means.

6. The writing system according to claim 1 wherein said output means comprises:
    a plurality of type elements each corresponding to a respective complete part contour,
    means for printing one of said type elements corresponding to a designated part contour on a recording medium, and
    printing position control means for controlling the position of printing said one type element in accordance with the position of the previously printed part contour.

7. The writing system according to claim 1 wherein said output means comprises a plurality of negative films respectively corresponding to said part contours, phototype setting means for selecting one of said negative films corresponding to a designated part contour and optically printing the same, and means for controlling the position of said optical printing in accordance with the position of the previously printed part contour.

8. The writing system according to claim 6 wherein said type elements corresponding to said part contours are mounted on an arcuate surface of at least one arcuate sector in groups determined by the position and size of said part contours in said non-alphabetic characters.

9. The writing system according to claim 7 wherein said negative films are mounted on an arcuate surface of at least one arcuate sector in groups determined by the position and size of said part contours in said non-alphabetic characters.

10. The writing system according to claim 5 wherein said output means comprises memory means which stores part contour dot matrix data corresponding to respective part contours and connected to produce part contour dot matrix data corresponding to a code signal applied to said memory means from said input means, means for generating and displaying the dot pattern of a given part contour based on the dot matrix data produced by said memory means, and means for controlling the position of writing said dot pattern in accordance with the position of the previously displayed part contour.

11. The writing system according to claim 1 wherein said output means comprises memory means which stores part contour photo display data corresponding to respective part contours, and produces part contour photo-display data corresponding to a code signal supplied to said memory means from said input means, means for displaying a given part contour by light in accordance with part contour photo display data produced by said memory means, and means for controlling the position of said displayed part contour in accordance with the position of the previously displayed part contour.

12. An input unit for a non-alphabetic character writing system comprising:
    a plurality of part contour indicating members respectively representing part contours each of which is one independent component of a non-alphabetic character and has predetermined concrete size and form,
    an input panel on which said part contour indicating members are arranged in groups according to their characteristics including their concrete size and their relative positions in one complete character,
    a plurality of switches associated with respective part contour indicating members,
    a code generating circuit responsive to the actuation of one of said switches for generating a code signal corresponding thereto, code signals for desired part contours being sequentially generated by sequentially actuating the switches associated with part contour indicating members corresponding to these desired part contours, whereby these code signals may be utilized as information designating selected non-alphabetic characters.

13. An output unit for a Kanji-character writing system comprising:
    a circuit means for receiving code signals each representing (a) a part contour constituting a severable, independent component of a Kanji-character to be written and (b) the relative size and location of said part contour within said Kanji-character, means for writing a set of part contours, writing output control means supplied with said code signals for selecting part contours corresponding thereto, and for causing said writing means to write selected part contours, and writing position control means, connected to receive said code signals and cooperating with said writing means, for controlling the writing position of each selected part contour in accordance with the relative size and location represented by the code signal for the previously written part contour, thereby accomplishing the writing of one complete Kanji-character by the combination of a plurality of consecutively written part contours in locations designated by the size and location of the previously written part contour.

14. A method for writing a non-alphabetic character comprising:

a step of sequentially selecting one or more desired part contours from among a plurality of part contours each of which is an independent component of a non-alphabetic character and has predetermined concrete size and form or profile, said plurality of part contours being divided into groups according to their characteristics including their concrete size and their relative positions in one complete character by means of selecting means arranged in groups on an input panel; and a step of outputting the selected part contour or contours individually in a written form so that the character is written as a result of combining the selected part contour or contours in predetermined relative positions.

15. An input unit according to claim 12 wherein said code generating circuit includes:

first circuitry for generating a first portion of said code signal, said first portion designating the specific form of the part contour associated with a particular actuated switch, and second circuitry for generating a second portion of said code signal, said second portion designating the relative size and position within a character of the part contour associated with said particular actuated switch.

16. An input unit according to claim 15 together with an output unit adapted to print a set of part contours corresponding to those represented by said plurality of part contour indicating members, and responsive to code signals from said input unit, said output unit including:

means for printing a part contour having a form designated by the first portion of a code signal at a position determined by the second portion of the preceding code signal.

17. A character writing method according to claim 14 wherein said outputting step includes writing the selected part contours without overlapping.

18. A character writing method according to claim 17 wherein said outputting step includes positioning each selected part contour in a relative position established by the previously written part contour.

19. An output unit for a non-alphabetic character writing system comprising:

a circuit means for producing code signals representing respective part contours constituting a character upon receipt of information designating a character to be written, means having part contour writing elements corresponding to various part contours for writing each individual part contour as a unit, writing output control means supplied with said code signals for selecting part contours corresponding thereto, and for writing selected part contours by said writing means, and a character completion control device for judging completion of writing of one character by the sequentially selected part contours and, if said one character has been completed, controlling said writing means so as to provide a space between said character and a character or a part contour to be written adjacent to said character.

20. A character writing system for Kanji-characters which consist of one or more independent part contours each having a definite form and a predetermined size that is one of a small set of permissible definite sizes, comprising:

part contour code generation means for generating code signals representing selected part contours constituting a Kanji-character, said part contours being selected sequentially in the desired order of writing, each code signal including a first portion designating the definite form of the associated part contour and a second portion designating the predetermined size and position within the character of said associated part contour, and writing means, responsive to said code signals and including a set of type elements corresponding to part contours available to be written, for writing the part contour having the definite form specified by the first portion of a code signal and for thereafter conditioning itself, in response to the second portion of said code signal, so as to write the part contour specified by the next consecutive coded signal at a position within the Kanji-character adjacent the previously written part contour.

21. A character writing system according to claim 20 wherein said code signal generated by said generation means includes a third portion designating the possible order of the associated part contour in the Kanji-character, said writing means including circuitry for ascertaining from the third portions of received code signals whether a Kanji-character has been completed, and if so, for conditioning said writing means to print out the next part contour at a position spaced from the completed character.

* * * * *